United States Patent [19]

Dergazarian

[11] Patent Number: 4,607,078

[45] Date of Patent: * Aug. 19, 1986

[54] BLENDS OF ORGANIC POLYMERS AND ORGANIC TERMINATED POLYSULFIDE POLYMERS

[75] Inventor: Thomas E. Dergazarian, Midland, Mich.

[73] Assignee: The Dow Chemical Company, Midland, Mich.

[*] Notice: The portion of the term of this patent subsequent to Mar. 20, 2001 has been disclaimed.

[21] Appl. No.: 681,356

[22] Filed: Dec. 13, 1984

Related U.S. Application Data

[63] Continuation-in-part of Ser. No. 552,237, Nov. 16, 1983, abandoned.

[51] Int. Cl.$^4$ .................. C08L 9/00; C08L 23/04; C08L 23/16; C08L 81/04
[52] U.S. Cl. ...................... 525/64; 524/500; 525/92; 525/93; 525/189; 525/403; 525/404; 525/523; 525/535; 525/537
[58] Field of Search .................. 525/189, 64, 92, 93, 525/523, 404, 535, 537, 403; 528/388; 524/500

[56] References Cited

U.S. PATENT DOCUMENTS

| | | | |
|---|---|---|---|
| 4,314,920 | 2/1982 | Millen | 525/189 |
| 4,421,899 | 12/1983 | Yamazuki et al. | 525/189 |
| 4,438,259 | 3/1984 | Meyer et al. | 528/388 |
| 4,476,284 | 10/1984 | Cleary | 525/189 |

*Primary Examiner*—Allan M. Lieberman

[57] ABSTRACT

Blends of organic-terminated polysulfide elastomers and organic polymers are disclosed. The organic polymer may be a saturated organic elastomer, an ethylenically unsaturated organic elastomer, a non-elastomeric polymer, or any combination blend of the three. Said blends exhibit unexpectedly good tensile properties and resilience and are useful for forming gaskets, membranes, sealants, adhesives, hoses, tubing and similar articles.

34 Claims, No Drawings

BLENDS OF ORGANIC POLYMERS AND ORGANIC TERMINATED POLYSULFIDE POLYMERS

REFERENCE TO RELATED APPLICATION

This application is a continuation-in-part of application Ser. No. 552,237, filed on Nov. 16, 1983, now abandoned.

BACKGROUND OF THE INVENTION

This invention relates to blends of organic polymers and curable and/or noncurable organic-terminated polysulfide polymers. The organic polymer may be a saturated organic elastomer, an ethylenically unsaturated organic elastomer, a non-elastomeric polymer, or any combination blend of the three.

Curable organic-terminated polysulfide polymers are useful as the primary ingredient or as an additive in sealants, adhesives and like compositions as well as for preparing diverse solid articles as gaskets, hoses, tubing and the like.

While such polysulfide polymers are generally quite suitable for these and other uses, it is often desirable to modify said polysulfide polymers in order to impart specific desirable properties thereto. For example, in a sealant or adhesive application it is often desirable to employ a polymer which has greater resilience and/or cohesive strength than is commonly exhibited by said polysulfide polymers, while maintaining the adhesion and resistance to water, solvents and ultraviolet light characteristic of polysulfide polymers.

Unfortunately, most conventional polysulfide polymers, particularly in the cured state, are insoluble in most solvents and incompatible with organic polymers. Accordingly, it is usually difficult to formulate such conventional polysulfide polymers with other polymers or even with common additives for polymeric compositions.

Accordingly it would be desirable to provide a polysulfide polymer composition which exhibits improved physical properties, particularly improved resilience, recovery, compression set, and lower modulus while maintaining general polysulfide properties.

SUMMARY OF THE INVENTION

The present invention is a polysulfide polymer composition which exhibits improved physical properties. In one aspect, this invention comprises a blend of curable and/or noncurable organic-terminated polysulfide polymer and an ethylenically unsaturated organic elastomer which is not an organic-terminated polysulfide.

Surprisingly, it has been found that such organic-terminated polysulfide polymer can be blended, even in the cured state, with an organic elastomer that contains a measurable amount of ethylenic unsaturation (i.e. nonconjugated carbon-carbon double bonds). Also surprising is that the resulting blends are stable and do not tend to phase separate or exhibit other undesirable characteristics of blends of incompatible polymers. These blends also exhibit improved physical properties such as tensile strength and resilience as compared to the corresponding organic-terminated polysulfide polymer alone.

Another aspect of the invention is a polysulfide polymer composition which comprises a blend of a curable and/or noncurable organic-terminated polysulfide elastomer and a saturated organic elastomer. These blends with the saturated organic elastomers are stable and exhibit improved physical properties as compared to the organic-terminated polysulfide elastomer alone.

In yet another aspect of the invention, a curable and/or noncurable organic-terminated polysulfide elastomer is blended wth a non-elastomeric polymer. These blends are also stable and exhibit improved physical properties as compared to the organic-terminated polysulfide elastomer alone.

DETAILED DESCRIPTION OF THE INVENTION

The composition of this invention comprises a blend of a curable and/or noncurable organic-terminated polysulfide polymer (hereinafter "polysulfide polymer") and an organic polymer. The organic polymer will be either an ethylenically unsaturated organic elastomer (hereinafter "unsaturated organic elastomer"), a saturated organic elastomer, a non-elastomeric polymer or a blend of any combination of the three. The relative proportions of polysulfide elastomer and organic polymer can be within any range wherein the polysulfide elastomer and organic polymer are compatible. Compatability for the purposes of this invention, is generally evidenced by a lack of phase separation in the blend. Generally, the blends of this invention contain from about 1 to about 99 weight percent polysulfide elastomer, based on a total weight of the polymers in the blend.

The polysulfide polymer included herein is a polymer of a metal sulfide, a copolymerizable polyfunctional organic compound and a copolymerizable monofunctional compound which gives rise to unsubstituted or inertly substituted organic-terminal groups. Said monofunctional organic compound advantageously contains a (vinylaryl)alkyl moiety in which case the resulting polysulfide polymer will be curable. Alternatively, the monofunctional organic compound will not contain any vinyl unsaturation, and the resulting polysulfide will not be curable.

Suitable curable elastomeric polysulfides are described in our copending application Ser. No. 426,559, filed Sept. 29, 1982 and now U.S. Pat. No. 4,438,259. Such an elastomer is a curable polysulfide copolymer as represented by general structure:

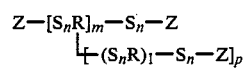

wherein n is a number from about 2 to about 8, l is zero or a positive number, m is a positive number, each R is independently an unsubstituted or inertly substituted organic polyradical with the radicals residing on carbon atoms, p is a number which is the difference in the number of radicals on R and 2, and each Z is independently chosen from the class consisting of (vinylaryl)alkyl and other inertly substituted non-crosslinking monoradicals, provided that a sufficient proportion of the terminal groups of said copolymer are (vinylaryl)alkyl so that said copolymers are curable.

In said curable elastomeric polysulfide, the terminal group Z is preferably an unsubstituted or inertly substituted vinylbenzyl group or a mixture thereof with an unsubstituted or inertly substituted non-crosslinking group, particularly a benzyl group. For the purpose of the invention, "inertly substituted" means that the radical contains no moieties which interfere with the preparation or subsequent curing of the elastomer.

The polyradicals are polyfunctional organic radicals in which the radicals reside on carbon atoms, i.e., the adjacent polysulfide linkages are bonded to a carbon atom on the organic polyradical. The R groups may be hydrocarbon, such as ethylene, propylene and like radicals, may contain hetero atoms such as ether linkages or may contain other inert substituent groups.

In the polysulfide linkages $S_n$, the sulfur link or average length of the sulfur chain is generally from about 2 to about 8, and is preferably from about 2 to about 5 sulfur atoms.

Of the foregoing structural components of the elastomer, the polysulfide linkages are primarily responsible for properties such as good adhesion and resistance to water, resistance to ultraviolet light and the like. When the sulfur link is 3 or greater, the sulfur linkages also impart flexibility to the elastomer. The organic polyradical often imparts flexibility and elongation to the elastomer. When the organic polyradical has a valence of 3 or more (i.e., a branched polymer is formed ($S_4$)), high modulus and low cold flow are imparted to the polymer. The terminal groups Z impart curing characteristics and the desired molecular weight.

The curable polysulfide polymers employed in this invention most preferably contain from about 50 to about 85 percent, preferably about 70 to 80 percent by weight sulfur and have a molecular weight, prior to curing, of about 1,500 to about 50,000, preferably 4,000 to 25,000, more preferably 4,000 to 12,000. It is further desirable that the curable polysulfide polymer contains a proportion of nonvinyl-group-containing terminal groups. Preferably, from about 10 to 75 percent of said terminal groups do not contain vinyl moieties.

Said elastomers are advantageously prepared according to the methods described in U.S. Pat. No. 4,438,259. In a preferred method, the elastomers are prepared by reacting a metal sulfide with elemental sulfur to prepare a metal polysulfide. The metal polysulfide is then reacted with at least one organic compound having a plurality of negatively charged functional groups which will split off upon reacting with a metal polysulfide, and a monofunctional (vinylaryl)alkyl compound which upon reacting gives rise to the desired terminal groups.

The metal polysulfide may be prepared by heating to reflux a mixture of a dissolved metal monosulfide, especially sodium sulfide and elemental sulfur. The metal polysulfide is subsequently reacted with the organic components by forming a mixture emulsion of the metal polysulfide (in aqueous solution) and the organics and heating to about 25° to 90° C. for about 5 minutes to about 2 hours.

Alternatively, the polysulfide elastomer may be a noncurable polysulfide polymer. Such noncurable polysulfide polymer contains organic-terminal groups, of which none or only a small amount are (vinylaryl)alkyl. By "a small amount", it is meant that the noncurable polymer contains a proportion of (vinylaryl)alkyl terminal group which is less than the amount which enables the polymer to significantly cure. Examples of such noncurable polysulfide polymers are as represented by the general structure:

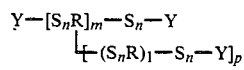

wherein n is a number from about 2 to about 8, l is zero or a positive number, m is a positive number, each R is independently an unsubstituted or inertly substituted organic polyradical with the radicals residing on carbon atoms, p is a number which is the difference in the number of radicals on R and 2, and each Y is independently chosen from the class consisting of (vinylaryl)alkyl and other inertly substituted non-crosslinking organic monoradicals, provided that the proportion of the terminal groups which are (vinylaryl)alkyl is less than that amount which enables the polymer to significantly cure. By "less than that amount which enables the polymer to significantly cure", it is meant that the polysulfide polymer, when fully "cured" by heating, is capable of cold flowing (i.e., when pressed onto a vertical surface it will flow under its own weight).

The terminal group Y can be any unsubstituted or inertly substituted noncrosslinking organic group or a mixture thereof with a minor amount of a (vinylaryl)alkyl group.

Preferably, the terminal group Y is a $C_1$–$C_{18}$ alkyl group, or an (aryl)alkyl group. More preferably, the terminal group is a benzyl group. The terminal group Y may contain diverse inert substituent groups which do not interfere with the preparation of the elastomer. The terminal group Y may comprise a minor portion of a (vinylaryl)alkyl group. Such (vinylaryl)alkyl groups generally comprise less than 10, preferably less than 5, more preferred less than 2 percent of the terminal groups in the noncurable polysulfide polymer.

Except for the proportion of (vinylaryl)alkyl terminal groups in these preferred noncurable polysulfide polymers, these noncurable polysulfide polymers generally and preferably contain the same constituent structural groups as described in the foregoing discussion of the preferred curable polysulfide polymers. In addition, a more detailed description of these noncurable polysulfide polymers and methods for their preparation is provided in the copending application Ser. No. 552,235 of Meyer and Dergazarian, entitled "Organic-Terminated Polysulfide Polymers" filed on Nov. 16, 1983 and now abandoned.

The unsaturated organic elastomer employed herein contains a measurable proportion of ethylenic unsaturation. The saturated organic elastomer employed herein contains a saturated chain of the polymethylene type. The term "elastomer" is employed herein to refer to high molecular weight polymers having the ability to be stretched to at least twice their normal length and to retract rapidly to approximately their original length when released. As used herein, the term elastomer includes both natural rubber and synthetic rubbers. Such elastomer may be a thermosettable polymer, but most typically, is thermoplastic.

The unsaturated organic elastomer contains a measurable amount of ethylenic unsaturation. By "ethylenic unsaturation" it is meant the presence of a nonconjugated carbon carbon double bond. Preferably, this carbon-carbon double bond is reactive (i.e., will readily engage in reactions common to compounds containing such unsaturation). The ethylenic unsaturation may reside along the polymer backbone, as in the case of polybutadiene elastomers, or may reside in a pendant group or a side chain such as ethylene/propylene/nonconjugated diene terpolymer.

The unsaturated organic elastomer contains a measurable proportion of said ethylenic unsaturation. While not intending to limit the invention to any theory, it is believed that the blend of the polysulfide polymer and the unsaturated organic elastomer has improved compatibility because of the vulcanization of the organic elastomer with the polysulfide polymer. However, the decision to use an unsaturated or saturated organic elastomer depends primarily on the end use of the resin and the properties sought for that resin.

Generally, the unsaturated organic elastomer advantageously contains at least about one carbon carbon double bond per 50 repeating units (mers) of the polymer. Preferably, there is at least one carbon carbon double bond per 10 mers, more preferably at least one carbon carbon double bond per 5 mers of the unsaturated organic polymer. Polymers such as polyisoprene, which contain essentially one carbon carbon double bond per repeating unit are also suitably employed herein.

The unsaturated organic elastomer may be a homopolymer of a monomer which polymerizes to a polymer containing ethylenic unsaturation. Alternatively, it may be a random copolymer of such a monomer with one or more other copolymerizable monomers which may or may not give rise to sites of ethylenic unsaturation in the polymer. In addition, the unsaturated organic elastomer may be a block copolymer having two or more discrete segments, one or more of which contain ethylenic unsaturation. Similarly, graft copolymers in which at least one of the backbone or grafted chains contain ethylenic unsaturation may be employed herein.

One suitable class of unsaturated organic elastomers includes the homopolymers and interpolymers of conjugated dienes. Examples of such homopolymers include poly(butadiene), poly(isoprene), poly(1,4-hexadiene) and the like. Said conjugated dienes may optionally contain inert substituent groups such as alkyl groups or halogen atoms. An example of a halogenated conjugated diene is chloroprene. Polymers of such conjugated dienes contain residual double bonds on the polymer backbone, approximately one double bond per repeating unit of the polymer.

Also suitable are random copolymers of conjugated dienes with at least one other copolymerizable monomer, which copolymers are elastomers containing ethylenic unsaturation. Said other copolymerizable monomers include, for example, alkenes such as ethylene, propene, n-butylene, isobutylene and the like, vinyl aromatics such as styrene, vinyltoluene, t-butylstyrene, vinylnaphthalene and the like, acrylic esters such as alkyl acrylates and alkyl methacrylates; halogenated alkenes such as vinyl chloride, vinylidene chloride, vinyl bromide and vinylidene bromide; acrylonitrile and acrylamide. Of particular interest are the so-called nitrile rubbers which are random copolymers of acrylonitrile and butadiene; styrene-butadiene rubbers; the so-called butyl rubbers which are copolymers of isobutylene and isoprene; and the halogenated analogs thereof.

In addition, homopolymers and copolymers of bicyclic dienes such as dicyclopentadiene, or norbornene. Terpolymers of ethylene and/or propylene with bicyclic dienes are also suitable.

The so-called polypenteneamers (i.e., polymers of cyclopentene and homologs thereof) are also useful herein.

In addition to the aforementioned homopolymers and copolymers, elastomeric block copolymers containing at least one segment having residual ethylenic unsaturation are suitably employed herein. Compatibility of the block copolymer and the polysulfide elastomer is readily tested by mixing small amounts of the block copolymer and the polysulfide in the desired proportions according to the methods described hereinafter and observing whether phase separation or other indicia of incompatibility occur. Especially suitable are block copolymers of styrene and a conjugated diene, such as styrene/isoprene block copolymers or styrene/isoprene triblock copolymers.

Similarly, graft copolymers wherein the polymer backbone and/or the graft segment contains ethylenic unsaturation can be employed herein. As with the block copolymers, the graft copolymers suitably contain sufficient of the unsaturated segment to enable the polymer to be blended with the polysulfide elastomer.

The saturated organic elastomers employed in this invention contain a saturated chain of the polymethylene type. Saturated organic elastomers are blended with curable and/or noncurable organic-terminated polysulfide elastomers to generally obtain a composition which exhibits improved physical properties similar to those exhibited when the polysulfide elastomers are blended with unsaturated organic elastomers. The saturated organic elastomer may be chlorinated polyethylene or polyisobutylene.

Another aspect of this invention involves the blending of non-elastomeric polymers with curable and/or noncurable polysulfide polymers. These blends exhibit improved physical properties including improved resilience, recovery compression set and lower modulus while maintaining general polysulfide properties. The non-elastomeric polymer may be polystyrene, low density polyethylene, high density polyethylene, linear low density polyethylene, or polychloromethyl oxirane. A suitable commercial polystyrene resin is sold under the trademark STYRON by The Dow Chemical Company. The non-elastomeric polymer may also be copolymers of: an alkyl acrylate and acrylonitrile; ethylene and vinyl acetate; ethylene and propylene; ethylene oxide and chloromethyl oxirane; and vinyl chloride and vinylidene chloride.

Another aspect of this invention involves the blending of any combination of the previously discussed organic polymers to obtain an organic polymer blend to blend with the polysulfide polymer. A preferred embodiment is the blending of a saturated organic elastomer, an unsaturated elastomer and a curable and/or noncurable polysulfide polymer. Examples of this blending method are shown in Examples 7A, 7B and 8. Such blends exhibit improved physical properties similar to those exhibited when polysulfide polymers are blended with unsaturated or saturated organic elastomers.

All the foregoing unsaturated and saturated organic elastomers can be prepared using addition polymerization techniques well known in the art. For a general overview on the preparation of organic elastomers see the Kirk-Othmer Encyclopedia of Chemical Technology, 3rd Edition, Vol. 8, pages 446–640.

A suitable commercial polyisoprene is sold under the name Natsyn 2205 by the Goodyear Chemical Company. An exemplary polyisobutylene is sold under the brand name Vistanex by Exxon Chemicals. Suitable commercially available nitrile rubbers include those sold under the brand names Hycar 1411 and Hycar 1422, available from B. F. Goodrich Company. A suitable styrene/butadiene block copolymer is sold under the name Solprene 1205 by Philips Petroleum Company. Kraton D1102, a triblock styrene/butadiene polymer having a melt index of 6 is also usefully employed herein. This polymer is available from Shell Chemical. Also useful is Kraton D1107 triblock styrene/isoprene polymer having a melt index of 9. This material is also available from Shell Chemical. A brominated butyl rubber and a chlorinated butyl rubber useful herein are commercially available from Exxon Chemicals.

The polysulfide polymer and the organic polymer are thoroughly mixed to form the blend of this invention. The blending is advantageously, but not necessarily, performed in the absence of an organic solvent. The blending can be accomplished at room temperature or at any elevated temperature at which the polysulfide elastomer and/or organic polymer are softened. Preferably, the blending is performed at about 20°–120° C. Blending is generally continued until the blend appears homogeneous. When a curable polysulfide polymer is employed, blending is preferably conducted while the polysulfide elastomer is in the uncured state. The energy expended in the blending process generally promotes some, if not complete, curing of the curable polysulfide elastomers. Such curing is especially present if the blending is conducted at elevated temperatures such as 50°–120° C.

Although it is not intended to limit the invention to any theory, it is believed that the energy expended in blending the elastomer not only promotes physical intermixing of the elastomers but also initiates a chemical reaction between the polysulfide elastomer and the organic polymer. It is theorized that the energy of mixing causes cleavage of some of the sulfur sulfur bonds in the polysulfide, forming free radicals and also produces free radicals in the organic polymer. These free radicals then react with sites of unsaturation on the unsaturated organic elastomer, forming crosslinks between the polysulfide elastomer and the unsaturated organic elastomer. In the reaction with saturated organic elastomer, crosslinks are formed due to free radical formation brought about by physical mastication. This result occurs even though there is no chemically reactive site on the saturated organic elastomer. It is believed that the formation of said crosslinkages in the blend is responsible for the unexpected compatibility of the polysulfide polymer and the organic elastomer.

The blends of this invention exhibit beneficial and unexpected properties. The polysulfide elastomer plasticizes the organic polymer, especially in those embodiments wherein the organic polymer is the major component of the blend. In addition, the polysulfide polymer can act as a vulcanizer for the unsaturated organic elastomer (i.e. the polysulfide polymer crosslinks the unsaturated organic elastomer). Thus, the polysulfide polymer can be employed in place of conventional plasticizers and vulcanizers for the unsaturated organic elastomer. However, the saturated organic elastomer is not vulcanizable. Block and graft polymer formation and crosslinking is still observed with the saturated organic polymer blends due to free radical formation. Additionally, the polysulfide polymer is vulcanizable and, therefore, curable through the vinyl groups by using elemental sulphur in the blend or through other reactive sites. The polysulfide polymer further imparts the desirable characteristics of improved adhesion and UV, ozone, solvent and water resistance to the blends, as compared to the organic polymer alone.

The blends of this invention also exhibit improved mechanical properties as compared to the polysulfide elastomer alone. In general, the blends of this invention, even those in which the organic polymer is a minor component, exhibit higher tensile strength and more elastomeric behavior than do the polysulfide polymers.

In addition, the blends of this invention are more resilient, have improved compression set and/or exhibit lower notch sensitivity than the corresponding polysulfide polymer alone. In some instances the blend is also more adhesive and resistant to solvents, water and the like than the corresponding organic polymer alone.

In addition to the polysulfide polymer and the organic polymer, the blends of this invention may optionally contain various additives such as fillers, pigments, reinforcing agents, curing agents, plasterizers, release agent, dyes, inhibitors and the like for their art recognized function. Because the polysulfide plasticize and vulcanizes the unsaturated organic elastomer, additional plasticizer and vulcanizer are generally not necessary in this blend.

Inorganic and organic pigments and fillers are also advantageously employed in these blends. Exemplary such pigments and fillers include carbon black, titanium dioxide, calcium carbonate, colored pigments like cadmium sulfide, clay, asbestos, wood fluor, zinc oxide and the like. While the particular amount of said pigment or filler employed varies somewhat depending on the particular properties desired as well as the molecular weight and composition of the polysulfide, in general such pigment or filler from about 0 to about 95, preferably from about 10 to about 60 percent by weight of the filled blend of this invention.

In general, increased levels of filler or pigment increase the tensile strength of the cured sealant. In addition, the low molecular weight polysulfide elastomers or elastomers with relatively low amounts of (vinylaryl)alkyl terminal groups will typically not cure or only cure to sealants having lower strength or resilience. Accordingly, the amount of pigment or filler employed can vary with the particular polysulfide to obtain the desired properties.

The blends of this invention are useful in preparing tough solvent-resistant articles such as gaskets, hoses, tubing, membranes, barrier films, weather resistant films, adhesive tapes, hot melt adhesive, hot melt sealant, and the like. The utility of the blends of this invention will, of course, depend somewhat on the particular composition thereof. For example, blends containing relatively small amounts of polysulfide polymer may be employed in applications for which the organic polymer alone is conventionally employed. In such applications, the blend of this invention will typically exhibit improved adhesion as well as greater solvent, water and ultraviolet light resistance. Similarly, the blend of this invention, having a high proportion of polysulfide polymer is advantageously employed as an adhesive/sealant or in like compositions for which conventional polysulfide elastomers are employed.

The following examples are provided to illustrate the invention but are not intended to limit the scope thereof. All parts and percentages are by weight unless otherwise indicated.

EXAMPLE 1

The polysulfide polymer employed in this example and Examples 2–6 and 9–12 is prepared by dissolving 27.7 weight percent (based on total weight of reactants) disodium sulfide in water, adding 34.2 weight percent precipitated sulfur and heating at reflux for about 1 hour to produce sodium polysulfide. Emulsifiers are then added to the aqueous phase, and 2.5 weight percent vinylbenzyl chloride, 2 weight percent benzyl chloride, 31.7 weight percent ethylene dichloride, and 1.9 weight percent 1,2,3-trichloropropane are added over a 1 hour period. The mixture is then heated to about 70° C. for 1 more hour. The emulsion is broken and a viscous liquid is recovered. This sample contains 78 percent sulfur and has a theoretical molecular weight of 6,000.

A 30 part portion of the polyisoprene (Natsyn 2205 sold by the Goodyear Chemical Company) is masticated at 30° C. in a Brabender Mixer until softened. To the softened polyisoprene is then added 100 parts of the polysulfide elastomer. The polyisoprene and the polysulfide elastomer are masticated on the Brabender until the blend assumes a uniform appearance. The resulting blend is then formed into a ⅛ inch thick film. The film is then cut into 4 inch by 4 inch by ⅛ inch tensile bars for evaluation. The tensile strength of the film is evaluated on an Instron tensile tester. A maximum tensile strength of 13.2 lbs./in$^2$ is exhibited. By comparision, a similar film prepared from the polysulfide elastomer alone exhibits a maximum tensile strength of only 7.7 lbs/in$^2$.

Another blend is prepared in like manner from 100 parts of polysulfide polymer, 30 parts polyisoprene and 30 parts carbon black. A film of the blended material is tested on the Instron and found to have a maximum tensile strength of 42.9 lbs/in$^2$.

EXAMPLE 2

A blend is prepared from 100 parts by weight polysulfide polymer and 30 parts by weight of a triblock styrene/butadiene polymer containing 28 percent styrene and 72 percent butadiene, which is sold commercially under the brand name Kraton D1102 by Shell Chemical Corporation. In forming the blend, the rubber is added to the Brabender Mixer at 125° C. and softened, at which time the polysulfide elastomer is added and mixed with the rubber until the blend appears homogeneous. This blend is tested on the Instron as described in Example 1 and found to exhibit a maximum tensile strength of 47.8 lbs/in$^2$. A film of this blend is stretched to 200 percent elongation and released. Upon release, the film retracts rapidly and recovers 94 percent of said elongation. Another film is elongated to 800 percent of its original length and released. Upon release, the film retracts by 85 percent.

EXAMPLE 3

The procedure of Example 2 is repeated, this time employing a triblock styrene/isoprene triblock polymer containing 14 percent styrene and 86 percent isoprene. This material is commercially available under the brand name Kraton D1107 from the Shell Chemical Corporation. Upon testing on the Instron, this blend exhibits a maximum tensile strength of 39.1 lbs/in$^2$. After elongation to 200 percent of its original length, a film retracted by 94 percent. Another film, after elongation to 800 percent of its original length, retracted by 64 percent.

EXAMPLE 4

A blend is prepared according to the method of Example 2, this time employing a linear diblock styrene butadiene polymer containing 25 percent styrene, 75 percent butadiene, which material is commercially available under brand name Solprene 1205 from the Phillips Petroleum Company. Upon testing on the Instron, this material exhibited a maximum tensile strength of 20 lbs/in$^2$.

EXAMPLE 5

A blend is prepared according to the procedure described in Example 2, this time employing a nitrile rubber containing 40 percent acrylonitrile. This material is sold commercially under the brand name Hycar 1411 by the B. F. Goodrich Company. Upon testing on the Instron, the material exhibits a maximum tensile strength of 36.4 lbs/in$^2$. A film of this material retracted by 88 percent after elongation to 400 percent of its original length. Another film of this material retracted by 40 percent after elongation to 800 percent of its original length.

EXAMPLE 6

A blend is formed according to the process of Example 1, this time employing a nitrile rubber containing 33 percent acrylonitrile. This material is commercially available under the brand name Hycar 1422 from B. F. Goodrich. Films from this material exhibited a maximum tensile strength of 28.8 lbs/in$^2$. A film prepared from this blend recovers by 55 percent after elongation to 400 times its original length and by 10 percent after elongation to 800 percent of its original length.

EXAMPLE 7

Using the general procedure described in Example 1, a polysulfide polymer is prepared from the following reagents:

| | |
|---|---|
| Na$_2$S (as nonahydrate) | 27.8 weight percent |
| Sulfur | 34.3 weight percent |
| Vinylbenzyl chloride | 2.2 weight percent |
| Benzyl chloride | 1.9 weight percent |
| Ethylene chloride | 32.8 weight percent |

The resulting polysulfide polymer is linear, curable and has a theoretical number average molecular weight of about 4,000.

The polysulfide is blended into Samples Nos. 7a, 7b and 7c according to the general procedure described in Example 2. The components of the blend are as indicated in the following table.

| | Sample No. (Parts) | | |
|---|---|---|---|
| Component | 7A | 7B | 7C |
| Polysulfide Elastomer | 100 | 100 | 100 |
| Kraton B1107 | 5 | 10 | 10 |
| Vistanex L-80[1] | 5 | 5 | — |
| Carbon Black N762 | 30 | 30 | 15 |
| Carbon Black N234 | — | — | 15 |
| ZnO | 2.5 | 2.5 | 2.5 |
| Peak Tensile (psi) | — | 14 | 66.3 |
| Tensile @ 800% elongation | — | 3.6 | 20.8 |

[1]Polyisobutylene, available from Exxon Chemicals

Sample No. 7A passed two cycles of the extension test described in ASTM D-1191-64. After two cycles of the test, the evaluation is terminated without failure of the sealant.

EXAMPLE 8

Using the general procedure described in Example 1, a polysulfide elastomer is prepared from the following reagents:

| | |
|---|---|
| Na$_2$S (as nonahydrate) | 28.3 weight percent |
| Sulfur | 34.8 weight percent |
| Vinylbenzyl chloride | 0.9 weight percent |
| Benzyl chloride | 0.7 weight percent |
| Ethylene dichloride | 35.3 weight percent |

Using the general procedure described in Example 1, 100 parts of this polysulfide elastomer are blended with 5 parts Vistanex L-80, 5 parts Kraton D1107, 30 parts carbon black and 2.5 parts zinc oxide. The blend exhibits a peak tensile of 33.9 psi and a tensile at 800 percent elongation of 7.0 psi.

EXAMPLE 9

A blend is prepared according to the procedure described in Example 1, this time employing 30 parts of polyisobutylene. This material is commercially available under the brand name Vistanex L-80 from Exxon Chemicals. A film from this blend exhibited a tensile of 16.3 lbs/in$^2$ at 800 percent elongation and a yield point of 100 percent elongation of 10.2 lbs/in$^2$.

EXAMPLE 10

A blend is prepared according to the procedure described in Example 1, this time employing 30 parts polystyrene (the polystyrene used is sold by The Dow Chemical Company under the trademark STYRON 60-75). A film from this blend exhibited a peak tensile of 95.5 lbs/in$^2$ and a tensile of 28.7 lbs/in$^2$ at 800 percent elongation.

EXAMPLE 11

A blend is prepared according to the procedure described in Example 1, this time employing 15 parts high density polyethylene. A film from this blend exhibited a peak tensile of 25.1 lbs/in$^2$ at 800 percent elongation.

EXAMPLE 12

A blend is prepared according to the procedure described in Example 1, this time employing 30 parts polypropylene. The polypropylene is commercially available under the brand name Profax 6323 from Hymont Corporation. Films from this blend exhibited a peak tensile of 31.2 lbs/in$^2$ and a tensile of 25.9 lbs/in$^2$ at 800 percent elongation.

What is claimed is:

1. A polymer blend comprising a blend of a curable or noncurable organic-terminated polysulfide polymer and an organic polymer which is not an organic-terminated polysulfide, wherein said polysulfide polymer is as represented by the general structure

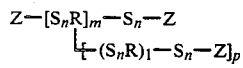

wherein n is a number from about 2 to about 8, l is zero or a positive integer, m is a positive integer, each R is independently an unsubstituted or inertly substituted organic polyradical with the radicals residing in carbon atoms, p is an integer which is the difference between the number of radicals on R and 2, and each Z is independently chosen from the class consisting of (vinylaryl)alkyl and other inertly substituted noncrosslinking monoradicals, and wherein said polysulfide polymer comprises from about 1 to about 99 percent by weight of the combined weight of the polysulfide polymer and the organic polymer and wherein the proportions of the polysulfide elastomer and the organic polymer are such that the blend is compatible as evidenced by a lack of phase separation in the blend.

2. The blend of claim 1 wherein said polysulfide polymer is a curable elastomer wherein a sufficient portion of the terminal groups of said copolymer are (vinylaryl)alkyl so that said polymer is curable.

3. The blend of claim 1 wherein said polysulfide polymer is a noncurable elastomer wherein the proportion of terminal groups which are (vinylaryl)alkyl is less than that amount which enables the polymer to significantly cure.

4. The blend of claim 2 wherein said organic polymer is an ethylenically unsaturated organic elastomer which contains at least about one carbon carbon double bond per 50 repeating units of said organic polymer.

5. The blend of claim 4 wherein said unsaturated organic elastomer is a homopolymer or copolymer of a conjugated diene.

6. The blend of claim 5 wherein said conjugated diene is butadiene, isoprene, or halogenated butyl rubbers.

7. The blend of claim 4 wherein the unsaturated organic elastomer is a block or graft copolymer of a conjugated diene.

8. The blend of claim 7 wherein the block or graft copolymer is a block or graft copolymer of styrene and butadiene or isoprene.

9. The blend of claim 4 wherein the unsaturated organic elastomer is a polymer of a bicyclic diene with ethylene and/or propylene.

10. The blend of claim 4 wherein the unsaturated organic elastomer is a polypenteneamer.

11. The blend of claim 3 wherein said organic polymer is an ethylenically unsaturated organic elastomer which contains at least about one carbon carbon double bond per 50 repeating units of said organic polymer.

12. The blend of claim 11 wherein said unsaturated organic elastomer is a homopolymer or interpolymer of a conjugated diene.

13. The blend of claim 12 wherein said conjugated diene is butadiene, isoprene, or halogenated butyl rubbers.

14. The blend of claim 11 wherein the unsaturated organic elastomer is a block or graft copolymer of a conjugated diene.

15. The blend of claim 14 wherein the block or grafted copolymer is a block or graft copolymer of styrene and butadiene or isoprene.

16. The blend of claim 11 wherein the unsaturated organic elastomer is a polymer of a bicyclic diene and ethylene and/or propylene.

17. The blend of claim 11 wherein the unsaturated organic elastomer is a polypenteneamer.

18. The blend of claim 2 wherein said organic polymer is a saturated organic elastomer.

19. The blend of claim 18 wherein said saturated organic elastomer is a saturated chain of a polymethylene.

20. The blend of claim 19 wherein said saturated polymethylene chain is a polymer of chlorinated polyethylene or polyisobutylene.

21. The blend of claim 3 wherein said organic polymer is a saturated organic elastomer.

22. The blend of claim 21 wherein said saturated organic elastomer is a saturated chain of a polymethylene.

23. The blend of claim 22 wherein said saturated polymethylene chain is a polymer of chlorinated polyethylene or polyisobutylene.

24. The blend of claim 2 wherein said organic polymer is a mixture of unsaturated and saturated organic elastomers.

25. The blend of claim 3 wherein said organic polymer is a mixture of unsaturated and saturated organic elastomers.

26. The blend of claim 2 wherein said organic polymer is a non-elastomeric polymer.

27. The blend of claim 26 wherein said non-elastomeric polymer is polystyrene, low density polyethylene, high density polyethylene, linear low density polyethylene, or polychloromethyl oxirane.

28. The blend of claim 26 wherein said non-elastomeric polymer is a copolymer of: an alkyl acrylate and acrylonitrile; ethylene and vinyl acetate; ethylene and propylene; ethylene oxide and chloromethyl oxirane; and vinyl chloride and vinylidene chloride.

29. The blend of claim 3 wherein said organic polymer is a non-elastomeric polymer.

30. The blend of claim 29 wherein said non-elastomeric polymer is polystyrene, low density polyethylene, high density polyethylene, linear low density polyethylene, or polychloromethyl oxirane.

31. The blend of claim 29 wherein said non-elastomeric polymer is a copolymer of: an alkyl acrylate and acrylonitrile; ethylene and vinyl acetate; ethylene and propylene; ethylene oxide and chloromethyl oxirane; and vinyl chloride and vinylidene chloride.

32. The blend of claim 1 further comprising an inorganic filler or pigment.

33. The blend of claim 1 which is shaped and formed into a gasket, membrane, hose, tube or other article of manufacture.

34. The blend of claim 1 wherein the ratio of said polysulfide elastomer and said organic polymer are suitable for use in a sealant or adhesive composition.

* * * * *